(12) United States Patent
Rosenberg

(10) Patent No.: US 7,356,857 B2
(45) Date of Patent: *Apr. 15, 2008

(54) MULTIPLE OUTPUT SHOWER ASSEMBLY

(76) Inventor: Maury Rosenberg, 1525 E. Putnam Ave., Apt. 301, Old Greenwich, CT (US) 06870

( * ) Notice: Subject to any disclaimer, the term of this patent is extended or adjusted under 35 U.S.C. 154(b) by 431 days.

This patent is subject to a terminal disclaimer.

(21) Appl. No.: 10/915,165

(22) Filed: Aug. 10, 2004

(65) Prior Publication Data

US 2005/0006500 A1 Jan. 13, 2005

Related U.S. Application Data

(63) Continuation-in-part of application No. 10/339,309, filed on Jan. 10, 2003, now Pat. No. 6,813,787.

(51) Int. Cl.
*A47K 3/022* (2006.01)
*A47K 3/00* (2006.01)
*B05B 1/14* (2006.01)

(52) U.S. Cl. ............... 4/601; 4/615; 239/536; 239/550

(58) Field of Classification Search ............ 4/601, 4/567–569, 615; 239/280, 536, 550–551, 239/282, DIG. 15; 137/599.11
See application file for complete search history.

(56) References Cited

U.S. PATENT DOCUMENTS

| | | | |
|---|---|---|---|
| 430,253 A * | 6/1890 | Reid | .............. 4/567 |
| 1,065,265 A | 6/1913 | Nordmark | |
| 2,228,626 A * | 1/1941 | Hetherington | ............ 236/93 R |
| 2,810,607 A * | 10/1957 | Hruby, Jr. | ................... 239/201 |
| 3,121,235 A | 2/1964 | Gellmann | |
| 3,913,839 A | 10/1975 | Wilson | |
| 3,961,770 A | 6/1976 | Wrasman | |
| 4,545,083 A | 10/1985 | Searson | |
| 5,678,258 A | 10/1997 | Healy | |
| 5,799,346 A | 9/1998 | Tiernan | |
| 6,227,456 B1 * | 5/2001 | Colman | ........................ 239/1 |
| 6,447,023 B1 | 9/2002 | Grimm | |
| 6,606,753 B2 | 8/2003 | Minnick | |
| 6,612,624 B1 | 9/2003 | Segal et al. | |

\* cited by examiner

*Primary Examiner*—Gregory L. Huson
*Assistant Examiner*—Kristie A. Mahone
(74) *Attorney, Agent, or Firm*—St. Onge Steward Johnston & Reens LLC

(57) ABSTRACT

A multiple output shower assembly is disclosed generally comprising a plurality of conduits in fluid communication with each other and at least three water output devices for discharging water from the assembly. The water output devices are located such that water is dischargeable from each of the water output devices without first flowing past any other output device in order to maintain pressure. In some embodiments, coupling mechanisms are provided to removably couple the conduits to each other and to a shower water source. In some embodiments, at least one restrictor is also provided to further equalize the pressure among the different water output devices.

26 Claims, 3 Drawing Sheets

MULTIPLE OUTPUT SHOWER ASSEMBLY

RELATED APPLICATIONS

This patent application is a continuation-in-part of U.S. patent application Ser. No. 10/339,309, filed Jan. 10, 2003 now U.S. Pat. No. 6,813,787.

FIELD OF THE INVENTION

The present invention relates to an apparatus for delivering shower water to a bather. More specifically, the invention relates to a shower assembly with multiple water outputs.

BACKGROUND OF THE INVENTION

Shower assemblies with more than one water output are generally well known in the art. These devices typically divert water to multiple output devices, such as shower heads, so that the shower water strikes the bather from different directions or at different angles.

For example, U.S. Pat. No. 3,913,839 to Wilson discloses a dual shower attachment device wherein a single shower water source is effectively converted into two, such that two shower heads are located at opposite ends of the shower. Similarly, U.S. Pat. No. 5,799,346 to Tiernan discloses a dual shower head system having two separate shower heads disposed at opposite ends of a shower line unit. In U.S. Pat. No. 6,227,456 to Colman, two pairs of shower heads are disclosed, such that a lower shower head pair may be used simultaneously with an upper shower head pair.

Many of these systems, however, utilize shower heads that are all at head level or above, such that the water does not reach the other parts of the bather's body with any reasonably high degree of pressure. Accordingly, a few systems have been suggested that employ multiple shower heads at varied heights in order to achieve this result. For example, in U.S. Pat. No. 1,065,265 to Nordmark, a portable shower bath is disclosed that utilizes numerous different shower heads at different heights to deliver water to the bather. More recent designs, such as those disclosed in U.S. Pat. No. 3,121,235 to Gellman and U.S. Pat. No. 5,678,258 to Healy, disclose a substantially vertical series of shower heads to deliver the shower water.

However, one disadvantage of these assemblies is that, in order to get to the lowest shower head, the water must flow past other water outlets. As a result, the pressure at which water is discharged from the lowest shower head is severely decreased. Another disadvantage of some of these assemblies is that they are not easily transported and connected to particular shower water sources.

What is desired, therefore, is a shower assembly that outputs shower water at several different heights. What is further desired is a shower assembly that can maintain a high pressure at which the water is discharged from each of the several different outputs. What is also desired is an assembly that is easily assembled and connected to an existing shower water source.

SUMMARY OF THE INVENTION

Accordingly, it is an object of the present invention to provide a shower assembly with multiple water output devices.

It is a further object of the present invention to provide a shower assembly where multiple water output devices are each located at the end of a flow line to maximize discharge pressure.

It is yet another object of the present invention to provide a shower assembly that can be easily assembled and disassembled.

In order to overcome the deficiencies of the prior art and to achieve at least some of the objects and advantages listed, the invention comprises a multiple output shower assembly, including a first conduit adapted to be coupled to a shower water source, the first conduit having an inlet for receiving water from the shower water source, a first outlet, and a second outlet, a first water output device located at the second outlet of the first conduit for discharging water from the assembly, a second conduit in fluid communication with the first conduit, the second conduit having an inlet for receiving water from the first outlet of the first conduit, and an outlet, a plurality of additional water output devices in fluid communication with the outlet of the second conduit such that water is dischargeable from each of the additional water output devices without flowing past any other of the additional water output devices.

In another embodiment, the invention comprises a multiple output shower assembly, including a first conduit having an inlet adapted to be coupled to a shower water source, the first conduit further having first and second outlets, a second conduit having an inlet coupled to the first outlet of the first conduit, the second conduit further having an outlet, a third conduit having an inlet coupled to the outlet of the second conduit, the third conduit further having first and second outlets, a first water output device coupled to the second outlet of the first conduit, first and second additional water output devices coupled to the first and second outlets of the third conduit.

In yet another embodiment, the invention comprises a multiple output shower assembly, including a plurality of conduits for transferring shower water, wherein each of the conduits is adapted to be coupled to at least one other of the conduits, wherein at least one of the conduits has an inlet adapted to be coupled to a shower water source for receiving shower water from the shower water source, and at least three water output devices for discharging water from the conduits, wherein the water output devices are coupled to the assembly such that water is dischargeable from each of the water output devices without flowing past any other water output device.

DETAILED DESCRIPTION OF THE DRAWINGS

Figure 1:
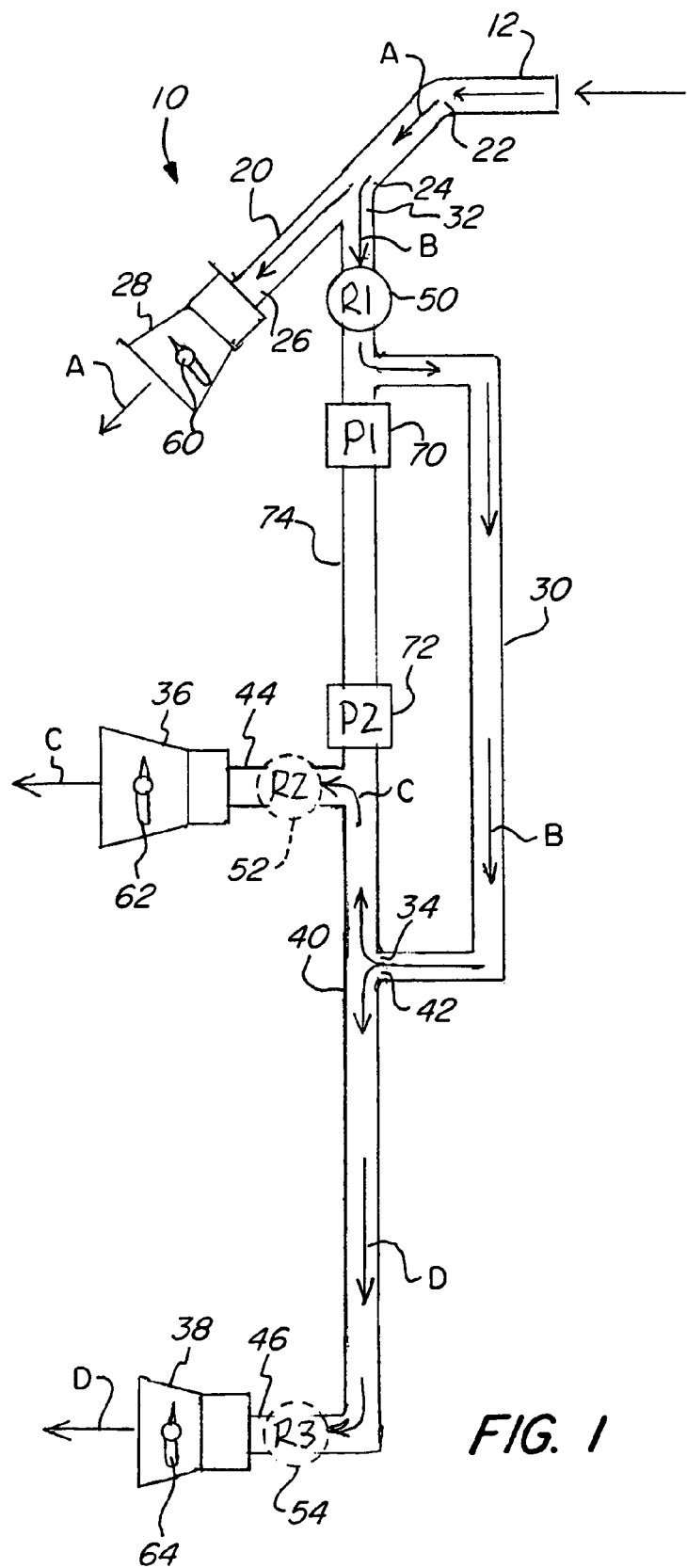
FIG. 1 is a schematic view of one embodiment of a multiple outlet shower assembly in accordance with the invention.

The basic components of several embodiments of a multiple output shower assembly 10 in accordance with the invention are illustrated in FIGS. 1-4. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

In the embodiment illustrated in FIG. 1, the shower assembly 10 includes a first conduit 20 adapted to be coupled to a shower water source 12. The conduit 20 includes an inlet 22 for receiving shower water from the shower water source 12, as well as first and second outlets 24, 26. A first water output device 28 is located at the second outlet 26 for discharging water to a bather.

A second conduit 30 is in fluid communication with the first conduit 20. The second conduit 30 has an inlet 32 that receives water from the first outlet 24 of the first conduit 20. The second conduit also has an outlet 34, which is in fluid communication with a plurality of additional water output devices 36, 38. The additional water output devices are located such that water flowing through the outlet 34 can be discharged from the first additional water output device 36 without flowing past the additional water output device 38, and such that water can be discharged from the additional water output device 38 without flowing past the additional water output device 36. In this way, the additional water output devices 36, 38 are each located at the end of a flow line such that pressure is maintained at each.

In the embodiment depicted in FIG. 1, this is accomplished via a third conduit 40 in fluid communication with the second conduit 30. The third conduit 40 has an inlet 42 that receives water from the outlet 34 of the second conduit 30. The third conduit also has first and second outlets 44, 46, at which the first and second additional water output devices 36, 38 are located, respectively. In certain advantageous embodiments, the inlet 42 is centrally located between the outlets 44, 46 in order to provide a center feed for the water distribution.

In the particular embodiment illustrated in FIG. 1, plugs 70, 72 are provided to block section 74 of the assembly in order to cause the second conduit 30 to act as a bypass conduit for bypassing the first outlet 44 of the third conduit 40. In other embodiments, however, there is no section 74, and the second conduit 30 is the only route by which water can flow to the additional water output devices 36, 38.

In some embodiments, a restrictor 50 is located in the second conduit 30 in order to restrict the flow of water therethrough. In this way, the water discharging from the additional water output devices 36, 38 is reduced in order to achieve more of an equilibrium with the water discharging from water output device 28, which has had to first flow past the first outlet 24 of the first conduit 20 before reaching the output device 28. In other embodiments, restrictors 52, 54 are placed in the vicinity of the individual additional water output devices 36, 38, located at or near the first and second outlets 44, 46 of the third conduit 40. Accordingly, in these embodiments, second conduit 30 can be configured to be coupled to the other conduits irrespective of its orientation—i.e., whether it is right side up or upside down.

In certain advantageous embodiments, the water output devices 28, 36, 38 are shower heads, which could be fixed shower heads, adjustable shower heads or adjustable hoses with attached shower heads, removably mounted shower heads, or any other devices for outputting shower water. Moreover, in some embodiments, the output devices 28, 36, 38 include closeable valves 60, 62, 64 for terminating and/or slowing the discharge of water from the output devices 28, 36, 38, respectively. In certain of these embodiments, one or more of the valves 60, 62, 64 are variable, allowing the user to determine precisely how much water he or she would like a particular output device 28, 36, 38 to discharge.

Figure 2:
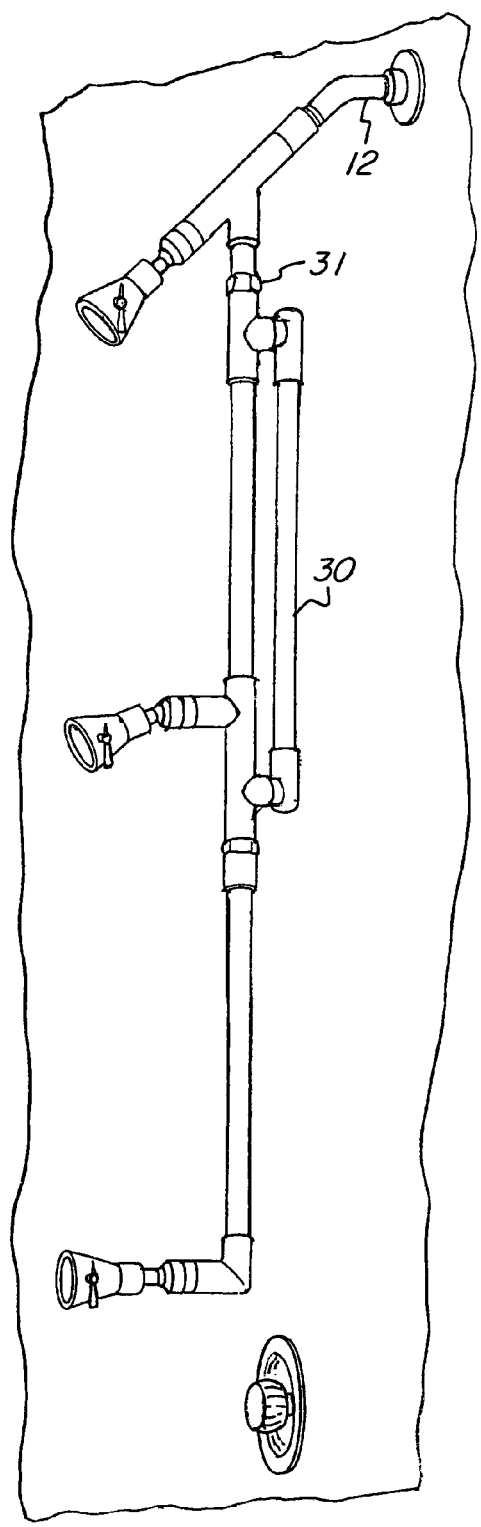
FIG. 2 is an isometric view of the shower assembly of FIG. 1.
Figure 3:
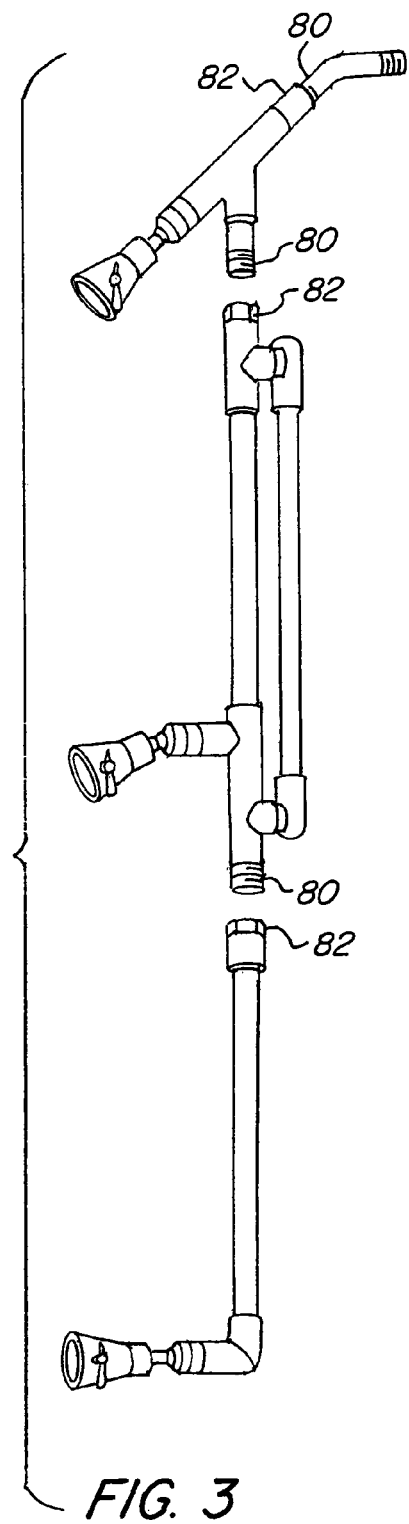
FIG. 3 is an isometric view of the shower assembly of FIG. 2 partially disassembled.
Figure 4:
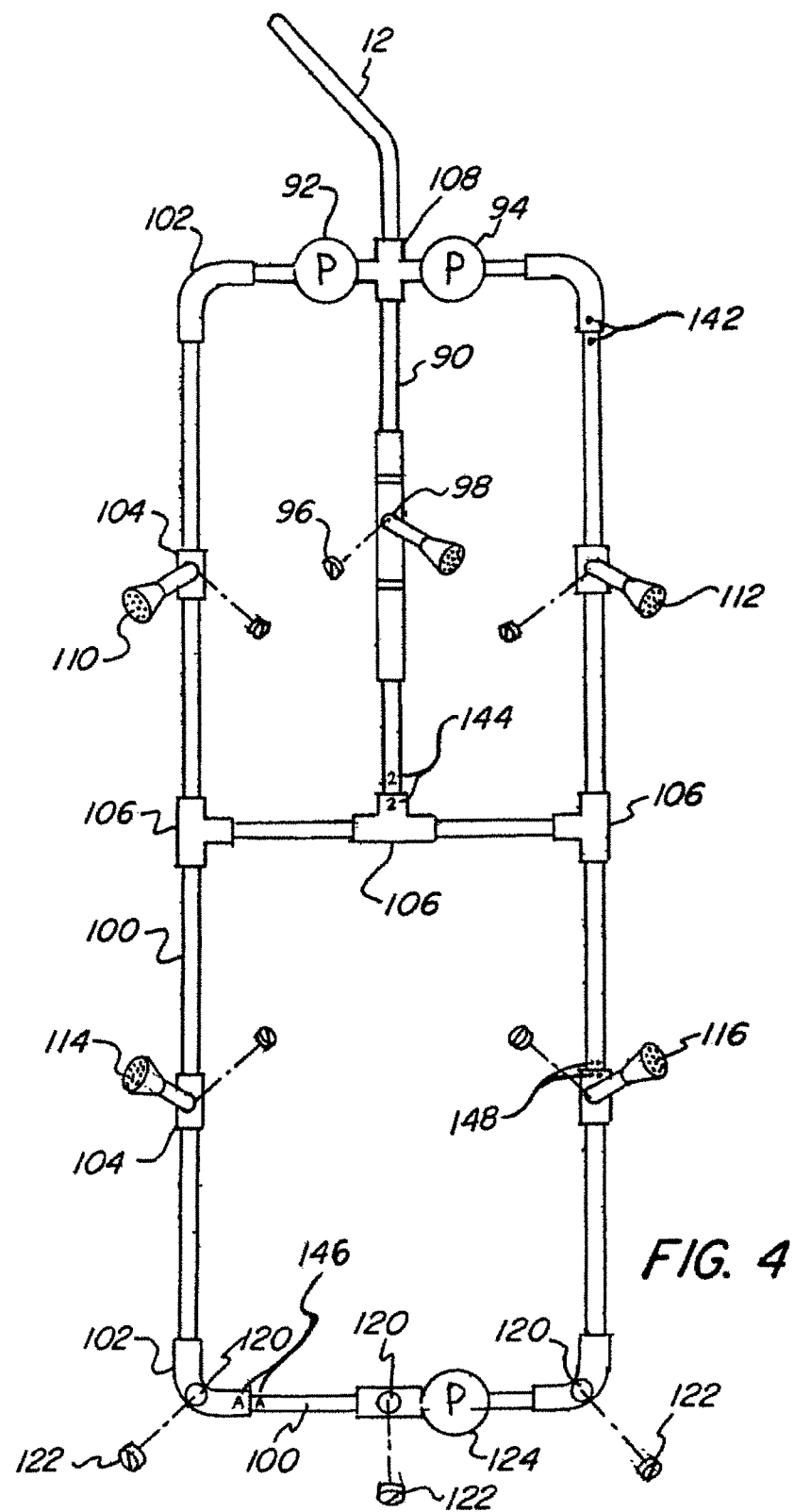
FIG. 4 is an isometric view of another embodiment of a multiple outlet shower assembly in accordance with the invention.

As shown in FIGS. 2-3, in certain advantageous embodiments, the invention comprises a kit of easily assembled and disassembled parts. In these embodiments, coupling mechanisms—such as, for example, male and female threads 80, 82—are provided for coupling the conduits together and for coupling at least one of the conduits to the shower water source 12. In some of these embodiments, in order to aid assembly, some type of coding is provided on or near the coupling mechanisms, as shown in FIG. 4. In certain embodiments, this coding is visual, such as, for example, color coding 142, numeric coding 144, or alphabetic coding 146. In other embodiments, this coding 148 is tactile, such as, for example, Braille. Additionally, in order to facilitate proper alignment of the parts, the ends of the conduits could be formed with a key/keyway.

In some of these embodiments, such as when the second conduit 30 is a bypass conduit that juts out from the vertical plane of the shower assembly 10, a swivel mechanism 31 may be employed to swing the assembly 10 away from the shower wall. Accordingly, a user can more easily couple the second conduit 30 to the first conduit 20 after the first conduit 20 has already been coupled to the shower water source 12, even if the process by which the second conduit 30 would be coupled to the first conduit 20 would have normally caused the conduit 30 to strike the shower wall.

The operation of the multiple shower output assembly is illustrated in FIG. 1. When the shower water source 12 is turned on and water is thereby supplied to the assembly 10, some of the water flows through the inlet 22, into the first conduit 20, through the outlet 26 and out the water output device 28 (indicated by arrows A). At the same time, some of the water supplied by the shower water source 12 flows through the inlet 22, into the first conduit 20, through the outlet 24 and the inlet 32, into the second conduit 30, and through the outlet 34 and the inlet 42 (indicated by arrows B). At that point, the water enters the third conduit 40, where some of the water flows towards and through the outlet 44 and out the water output device 36 (indicated by arrows C), while some of the water flows towards and through the outlet 46 and out the water output device 38 (indicated by arrows D).

In other embodiments, such as that shown in FIG. 4, a greater number of conduits, and thus, a greater number of water output devices, may be provided by coupling various individual parts together in various configurations. The individual parts may include any devices suitable for channeling, changing the direction of, or blocking the flow of shower water. For example, tubes 100 of various lengths may be provided for transferring the shower water, while elbow connectors 102, tee connectors 104 (having slip fittings at each end and a threaded fitting at the center opening) tee connectors 106 (having slip fittings at all three openings), and cross connectors 108 may be provided for changing the direction of water flow. By using various internal and external plugs, water can be discharged from various numbers of water output devices at various locations without flowing past other water output devices.

For example, in one particular embodiment, internal plugs 92, 94 are employed to direct the shower water from the shower water source 12 down into conduit 90. Plug 96 is employed to block the outlet 98 so that the water flow continues on to tee connectors 106, which collectively divert the water to shower heads 110, 112, 114, 116. Any remaining outlets 120 are also blocked by plugs 122, while another internal plug 124 ensures that water discharged from each of the shower heads 119, 112, 114, 116 does not first flow past any other shower head.

As explained above, in some embodiments, the various parts of the assembly described herein are coupled together via mating male and female threads. In other embodiments, slip joint combinations are used, while in yet other embodiments, separate tube couplers, or any other mechanism suitable for coupling the various parts of the assembly without resulting in water leakage, are employed. All of the above described parts may be fashioned from any material suited for regular water flow, such as non-rusting metals, PVC, or any durable plastic.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A multiple output shower assembly, comprising:
    a first section of piping adapted to be coupled to a shower water source, said first section having an inlet end for receiving water from the shower water source, a first outlet end, and a second outlet end;
    a first showerhead coupled to the second outlet end of said first section of piping for discharging water from the assembly;
    a second section of piping removably coupled to said first section of piping, said second section having
        a first pipe having an inlet end removably coupled to the first outlet end of said first section of piping for receiving water therefrom, and an outlet end;
        at least one plug disposed in said first pipe between the inlet and outlet ends of said first pipe for blocking the communication of water therethrough; and
        a second pipe for bypassing the at least one plug disposed in said first pipe, said second pipe having an inlet end coupled to the inlet end of said first pipe for receiving water therefrom, and an outlet end coupled to the outlet end of said first pipe for discharging water;
    a third section of piping removably coupled to said second section of piping, said third section of piping having a inlet end removably coupled to the outlet end of said first pipe, and an outlet end;
    a second showerhead coupled to the outlet end of said third piping section for discharging water from the assembly;
    a third showerhead coupled to the outlet end of said first pipe such that the water discharged from the outlet end of said second pipe is separated into a first flow to said third showerhead, wherein said first flow does not pass said second showerhead, and a second flow to said second showerhead, wherein said second flow does not pass said third showerhead; and
    a restrictor located in said first section of piping for restricting the flow of water from said first section of piping to said second section of piping.

2. The shower assembly as claimed in claim 1, further comprising:
    a second restrictor adjacent the second showerhead for restricting the flow of water therethrough; and
    a third restrictor adjacent the third showerhead for restricting the flow of water therethrough.

3. The shower assembly as claimed in claim 1, wherein said at least one plug comprises a first plug positioned adjacent the inlet end of said first pipe and a second plug positioned adjacent the outlet end of said second pipe.

4. The shower assembly as claimed in claim 1, wherein at least one of said first, second, and third showerheads includes a closable valve for preventing the discharge of water from the respective showerhead.

5. The shower assembly as claimed in claim 1, wherein at least one of said first, second, and third showerheads includes a variable valve for slowing the discharge of water from the respective showerhead.

6. The shower assembly as claimed in claim 1, further comprising a coupling mechanism for removably coupling the assembly to the shower water source, wherein the inlet and outlet ends of said second pipe are removably coupled to the inlet and outlet ends of said first pipe, and wherein said first, second, and third showerheads are removably coupled to said first, second, and third sections of piping.

7. The shower assembly as claimed in claim 1, wherein said first, second, and third sections of piping are coupled via coupling mechanisms that include visual coding.

8. The shower assembly as claimed in claim 1, wherein said first, second, and third sections of piping are coupled via coupling mechanisms that include tactile coding.

9. The shower assembly as claimed in claim 1, further comprising a swivel mechanism by which said second section of piping swivels with respect to said first section of piping.

10. A multiple output shower assembly, comprising:
    a first section of piping adapted to be coupled to a shower water source, said first section having an inlet end for receiving water from the shower water source, a first outlet end, and a second outlet end;
    a first showerhead coupled to the second outlet end of said first section of piping for discharging water from the assembly;
    a second section of piping removably coupled to said first section of piping, said second section having
        a first pipe having an inlet end removably coupled to the first outlet end of said first section of piping for receiving water therefrom, and an outlet end;
        at least one plug disposed in said first pipe between the inlet and outlet ends of said first pipe for blocking the communication of water therethrough; and
        a second pipe for bypassing the at least one plug disposed in said first pipe, said second pipe having an inlet end coupled to the inlet end of said first pipe for receiving water therefrom, and an outlet end coupled to the outlet end of said first pipe for discharging water;
    a third section of piping removably coupled to said second section of piping, said third section of piping having a inlet end removably coupled to the outlet end of said first pipe, and an outlet end;
    a second showerhead coupled to the outlet end of said third piping section for discharging water from the assembly; and
    a third showerhead coupled to the outlet end of said first pipe such that the water discharged from the outlet end of said second pipe is separated into a first flow to said third showerhead, wherein said first flow does not pass said second showerhead, and a second flow to said second showerhead, wherein said second flow does not pass said third showerhead.

11. The shower assembly as claimed in claim 10, further comprising first and second restrictors adjacent the second and third showerheads, respectively, for restricting the flow of water therethrough.

12. The shower assembly as claimed in claim 10, wherein said at least one plug comprises a first plug positioned adjacent the inlet end of said first pipe and a second plug positioned adjacent the outlet end of said second pipe.

13. The shower assembly as claimed in claim 10, wherein at least one of said first, second, and third showerheads includes a closable valve for preventing the discharge of water from the respective showerhead.

14. The shower assembly as claimed in claim 10, wherein at least one of said first, second, and third showerheads includes a variable valve for slowing the discharge of water from the respective showerhead.

15. The shower assembly as claimed in claim 10, further comprising a coupling mechanism for removably coupling the assembly to the shower water source, wherein the inlet and outlet ends of said second pipe are removably coupled to the inlet and outlet ends of said first pipe, and wherein said first, second, and third showerheads are removably coupled to said first, second, and third sections of piping.

16. The shower assembly as claimed in claim 10, wherein said first, second, and third sections of piping are coupled via coupling mechanisms that include visual coding.

17. The shower assembly as claimed in claim 10, wherein said first, second, and third sections of piping are coupled via coupling mechanisms that include tactile coding.

18. The shower assembly as claimed in claim 10, further comprising a swivel mechanism by which said second section of piping swivels with respect to said first section of piping.

19. A multiple output shower assembly, comprising:
   first piping adapted to be coupled to a shower water source, said first piping having an inlet end for receiving water from the shower water source, a first outlet end, and a second outlet end;
   a first showerhead coupled to the second outlet end of said first piping for discharging water from the assembly;
   second piping removably coupled to said first piping, said second piping having a first inlet end removably coupled to the first outlet end of said first piping for receiving water therefrom, first and second outlets, a conduit leading from the inlet end of said second piping to the outlets of said second piping, a bypass outlet, and a bypass inlet located between the first and second outlets of said second piping;
   second and third showerheads coupled to the first and second outlets of said second piping;
   at least one plug disposed in the conduit between the bypass outlet and the bypass inlet for blocking the communication of water through said conduit; and
   bypass piping having an inlet connected to the bypass outlet of said second piping and an outlet connected to the bypass inlet of said second piping for bypassing said at least one plug and communicating the water received from said first piping to said second and third showerheads; and
   a restrictor located in said first piping for restricting the flow of water from said first piping to said second piping.

20. The shower assembly as claimed in claim 19, further comprising:
   a second restrictor adjacent the second showerhead for restricting the flow of water therethrough; and
   a third restrictor adjacent the third showerhead for restricting the flow of water therethrough.

21. The shower assembly as claimed in claim 19, wherein at least one of said first, second, and third showerheads includes a closable valve for preventing the discharge of water from the respective showerhead.

22. The shower assembly as claimed in claim 19, wherein at least one of said first, second, and third showerheads includes a variable valve for slowing the discharge of water from the respective showerhead.

23. The shower assembly as claimed in claim 19, wherein said at least one plug comprises a first and second plugs.

24. The shower assembly as claimed in claim 19, wherein said first piping is coupled to said second piping via a coupling mechanism that includes visual coding.

25. The shower assembly as claimed in claim 19, wherein said first piping is coupled to said second piping via a coupling mechanism that includes tactile coding.

26. The shower assembly as claimed in claim 19, further comprising a swivel mechanism by which said second piping swivels with respect to said first piping.

* * * * *